US012595998B2

(12) United States Patent
Ishihara et al.

(10) Patent No.: US 12,595,998 B2
(45) Date of Patent: Apr. 7, 2026

(54) STRAIN GAUGE

(71) Applicant: MINEBEA MITSUMI Inc., Nagano (JP)

(72) Inventors: Iku Ishihara, Nagano (JP); Aya Ono, Nagano (JP); Yosuke Ogasa, Nagano (JP); Yuta Aizawa, Nagano (JP); Toshiaki Asakawa, Nagano (JP); Atsushi Kitamura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 317 days.

(21) Appl. No.: 18/255,739

(22) PCT Filed: Dec. 3, 2021

(86) PCT No.: PCT/JP2021/044565
§ 371 (c)(1),
(2) Date: Jun. 2, 2023

(87) PCT Pub. No.: WO2022/124238
PCT Pub. Date: Jun. 16, 2022

(65) Prior Publication Data
US 2023/0408245 A1      Dec. 21, 2023

(30) Foreign Application Priority Data

| | | |
|---|---|---|
| Dec. 11, 2020 | (JP) | 2020-205935 |
| Jun. 4, 2021 | (JP) | 2021-094559 |

(51) Int. Cl.
*G01B 7/16* (2006.01)
(52) U.S. Cl.
CPC ..................................... *G01B 7/20* (2013.01)

(58) Field of Classification Search
CPC ...................................................... G01B 7/20
See application file for complete search history.

(56) References Cited

U.S. PATENT DOCUMENTS

| | | | |
|---|---|---|---|
| 2021/0018382 A1* | 1/2021 | Misaizu | ................ G01L 1/2287 |
| 2023/0175831 A1* | 6/2023 | Kitamura | ................. G01B 7/18 |
| | | | 73/774 |
| 2023/0375325 A1* | 11/2023 | Ogasa | ...................... G01B 7/18 |

FOREIGN PATENT DOCUMENTS

| | | |
|---|---|---|
| JP | S59-077303 | 5/1984 |
| JP | H06-300649 | 10/1994 |
| JP | 3040684 U | 8/1997 |
| JP | 2013-092427 | 5/2013 |
| JP | 2015-031633 | 2/2015 |
| JP | 2016-074934 | 5/2016 |
| JP | 2019-113411 | 7/2019 |

OTHER PUBLICATIONS

International Search Report for PCT/JP2021/044565 mailed on Feb. 15, 2022.

* cited by examiner

*Primary Examiner* — Francis C Gray
(74) *Attorney, Agent, or Firm* — IPUSA, PLLC

(57) ABSTRACT

According to the present disclosure, a strain gauge has: a flexible substrate; a resistor formed on the substrate; and a pair of electrodes formed on the substrate and electrically connected with the resistor via conductive traces, and, in this strain gauge, a width of the resistor is 10 μm or more and 100 μm or less, and the conductive traces include a portion with a width of 5 μm or more and 100 μm or less.

12 Claims, 6 Drawing Sheets

STRAIN GAUGE

TECHNICAL FIELD

The present disclosure relates to a strain gauge.

BACKGROUND ART

Conventionally, a strain gauge is attached to an object to be measured, and the strain of the measurement object is detected. The strain gauge has a resistor for detecting strain, and the resistor is formed, for example, on insulating resin. The resistor is connected to an electrode via a conductive trace, for example (see Patent Document 1, for example).

CITATION LIST

Patent Document

Patent Document 1: Japanese Unexamined Patent Application Publication No. 2016-74934

SUMMARY OF THE INVENTION

Problem to be Solved by the Invention

A strain gauge is attached to a flexure element, and, by expanding and contracting following the movement of the flexure element, detects the amount of strain of the flexure element. Therefore, in order to detect a larger amount of strain, the strain gauge itself must not be damaged during the process of expansion and contraction, and needs to have higher strain resistance.

The present disclosure has been prepared in view of the above, and an object of the present disclosure is therefore to provide a strain gauge with improved strain resistance.

Means for Solving the Problem

According to the present disclosure, a strain gauge has: a flexible substrate; a resistor formed on the substrate; and a pair of electrodes formed on the substrate and electrically connected with the resistor via conductive traces, and, in this strain gauge, a width of the resistor is 10 µm or more and 100 µm or less, and the conductive traces include a portion with a width of 5 µm or more and 100 µm or less.

Advantageous Effects of the Invention

According to the technique disclosed herein, it is possible to provide a strain gauge with improved strain resistance.

BRIEF DESCRIPTION OF THE DRAWINGS

FIG. 5 is a plan view that illustrates an example of a strain gauge according to a modification 1 of the first embodiment.

EMBODIMENTS FOR CARRYING OUT THE INVENTION

An embodiment of the present disclosure will be described below with reference to the accompanying drawings. In each drawing, the same components will be assigned the same reference signs and may in some cases not be described in a redundant manner.

First Embodiment

Figure 1:
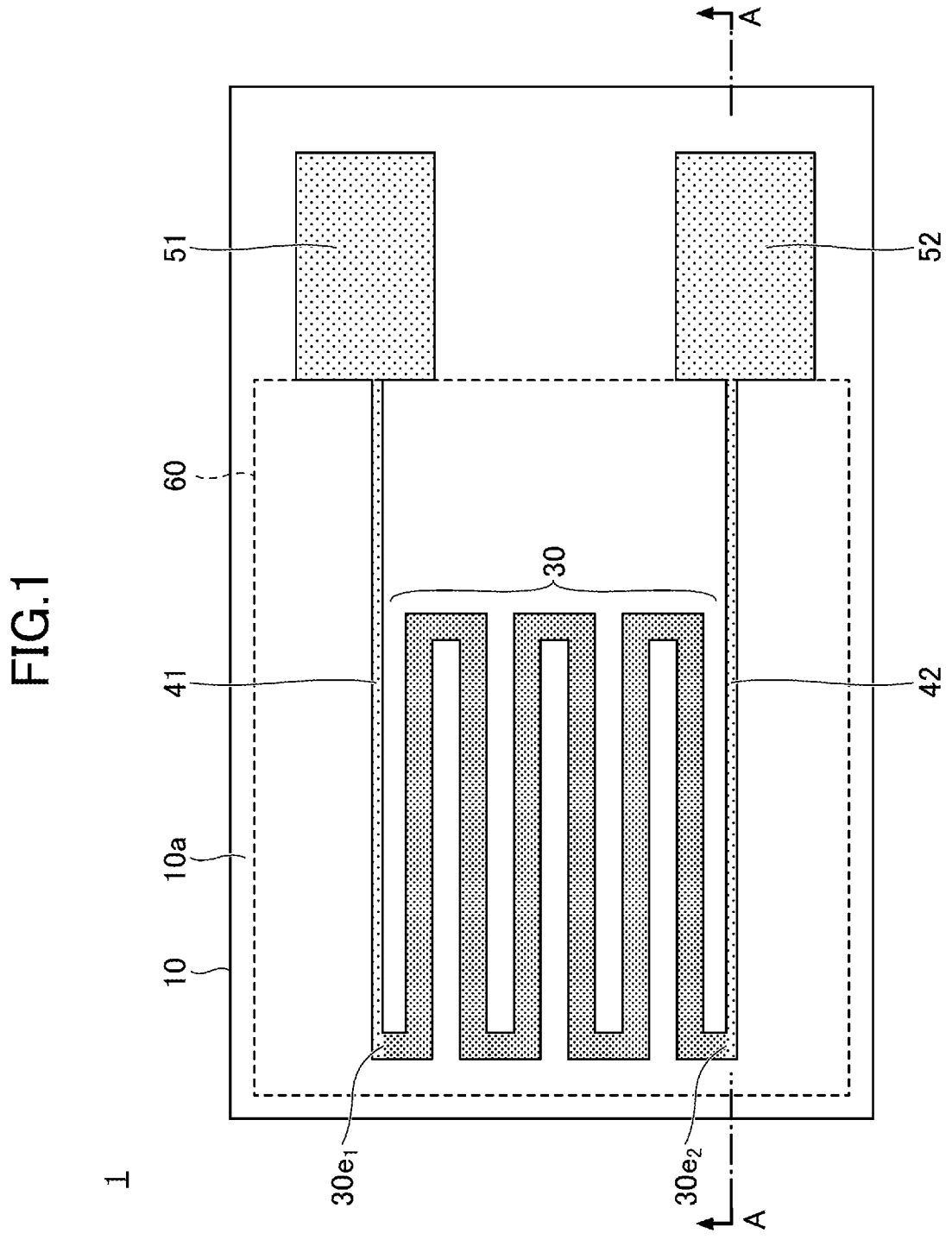
FIG. 1 is a plan view of an example of a strain gauge according to a first embodiment.
Figure 2:
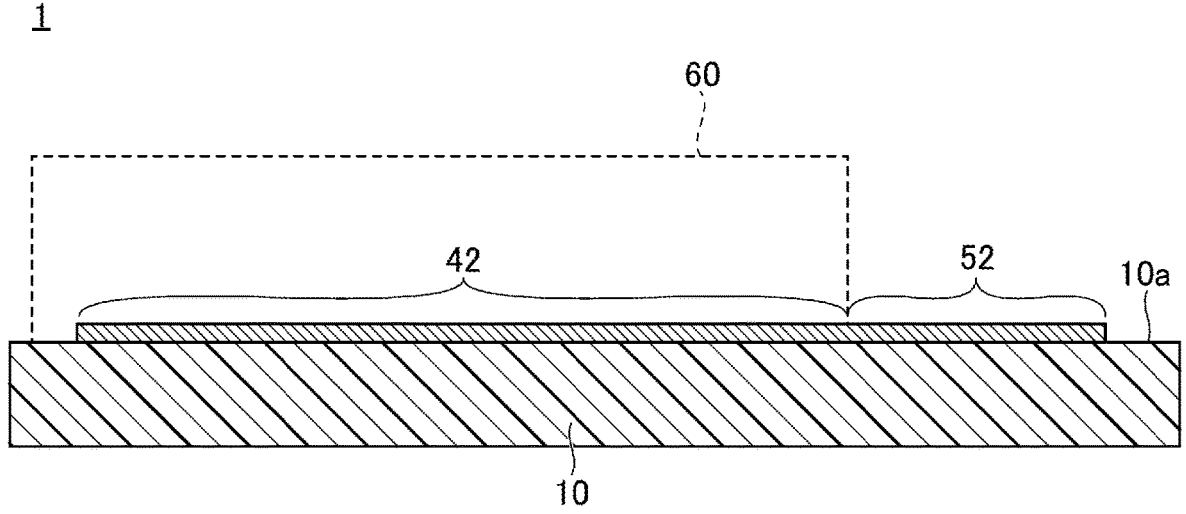
FIG. 2 is a cross-sectional view (example 1) that illustrates an example of the strain gauge according to the first embodiment.
Figure 3:
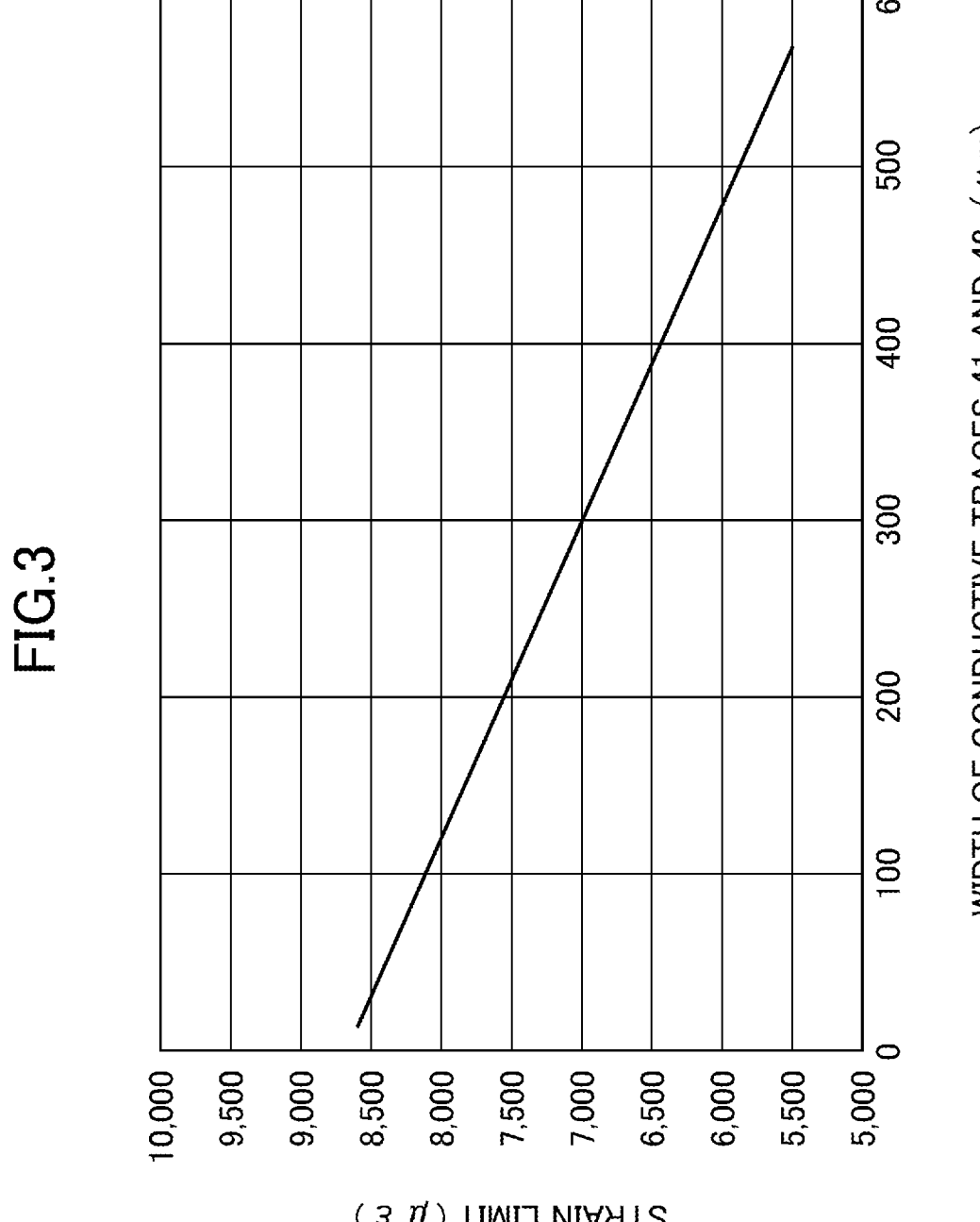
FIG. 3 is a diagram that illustrates an outcome of an experiment on strain limit.

FIG. 1 is a plan view that illustrates a strain gauge according to a first embodiment. FIG. 2 is a cross-sectional view that illustrates the strain gauge according to the first embodiment, showing a cross-section along line A-A in FIG. 1. FIG. 3 is a cross-sectional view that illustrates the strain gauge according to the first embodiment, showing a cross-section along line B-B in FIG. 1. Referring to FIG. 1 and FIG. 2, the strain gauge 1 has a substrate 10, a resistor 30, conductive traces 41 and 42, and electrodes 51 and 52.

Note that, with the present embodiment, for ease of explanation, the side of the substrate 10 in the strain gauge 1 on which the resistor 30 is provided will be referred to as "the upper side" or "one side," and the side of the substrate 10 on which the resistor 30 is not provided will be referred to as "the lower side" or "the other side." Furthermore, in each component or part, the surface on the side where the resistor 30 is provided will be referred to as "one surface" or "the upper surface," and the surface on the side where the resistor 30 is not provided will be referred to as "the other surface" or "the lower surface." However, the strain gauge 1 can be used upside down, or can be disposed at any angle. Furthermore, plan view herein means that an object is viewed in a direction normal to an upper surface 10a of the substrate 10, and plan shape herein refers to the shape of an object as viewed in a direction normal to the upper surface 10a of the substrate 10.

The substrate 10 is a member that serves as a base layer for forming the resistor 30 and the like, and is flexible. The thickness of the substrate 10 is not particularly limited and can be selected in accordance with the purpose of use. For example, the substrate 10 may be approximately 5 µm to 500 µm thick. In particular, it is preferable if the substrate 10 is 5 µm to 200 µm thick, because the transmission of strain from the surface of the strain generating body joined to the lower surface of the substrate 10 via a bonding layer or the like, the dimensional stability in the environment, and so forth are excellent. It is even more preferable if the substrate is 10 µm thick or more because the insulation is excellent.

The substrate 10 can be formed from an insulating resin film made of, for example, a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a liquid crystal polymer (LCP) resin, a polyolefin resin, and so forth. Note that a film herein refers to a flexible member that is approximately 500 µm thick or less.

Here, "the substrate 10 can be formed from an insulating resin film" by no means precludes the substrate 10 from containing fillers, impurities, and so forth, in the insulating resin film. The substrate 10 may be formed from, for example, an insulating resin film that contains fillers such as silica or alumina.

Examples of materials of the substrate 10 other than resin include crystalline materials such as $SiO_2$, $ZrO_2$ (including YSZ), Si, $Si_2N_3$, $Al_2O_3$ (including sapphire), ZnO, perovskite ceramics ($CaTiO_3$, $BaTiO_3$, etc.) and so forth. Further, additional examples include amorphous glass and the like. Furthermore, as materials of the substrate 10, metals such as aluminum, an aluminum alloy (duralumin), titanium, and others may be used. In this case, for example, an insulating film is formed on the substrate 10 of metal.

The resistor 30 is a thin film formed on the substrate 10 in a predetermined pattern, and is a sensitive part configured such that that resistance changes in response to strain. The resistor 30 may be formed directly on the upper surface 10a of the substrate 10, or may be formed on the upper surface 10a of the substrate 10 via other layers. Note that, in FIG. 1, the resistor 30 is shown with a dark satin pattern for ease of explanation.

The resistor 30 has a plurality of elongated portions, arranged at predetermined intervals with their longitudinal directions oriented in the same direction (the direction of line A-A in FIG. 1), and the ends of adjacent elongated portions are alternately connected to form a zigzag structure on the whole. The longitudinal direction of the elongated portions is the grid direction, and the direction perpendicular to the grid direction is the grid width direction (the direction of line B-B in FIG. 1).

Ends of the two elongated portions in the longitudinal direction, located on the outermost side in the grid width direction, are bent in the grid width direction, and form respective ends 30$e_1$ and 30$e_2$ of the resistor 30 in the grid width direction. The end 30$e_1$ of the resistor 30 in the grid width direction is electrically connected to the electrode 51 via one conductive trace 41, and the end 30$e_2$ of the resistor 30 in the grid width direction is electrically connected to the electrode 52 via one conductive trace 42. Note that the conductive trace 41 is an example of the first conductive trace according to the present disclosure, and the conductive trace 42 is an example of the second conductive trace according to the present disclosure.

The resistor 30 can be made of, for example, a material containing Cr (chromium), a material containing Ni (nickel), or a material containing both Cr and Ni. That is, the resistor 30 can be made of a material containing at least one of Cr and Ni. Materials containing Cr include, for example, a Cr composite film. Materials containing Ni include, for example, Cu—Ni (copper nickel). Materials containing both Cr and Ni include, for example, Ni—Cr (nickel chromium).

Here, a Cr composite film refers to a composite film of Cr, CrN, $Cr_2N$, and the like. A Cr composite film may contain incidental impurities such as chromium oxide.

The thickness of the resistor 30 is not particularly limited and can be selected in accordance with the purpose of use. The resistor 30 can be, for example, approximately 0.05 μm to 2 μm thick. In particular, it is preferable if the resistor 30 is 0.1 μm thick or more, because the crystallinity of crystals (for example, the crystallinity of α-Cr) constituting the resistor 30 improves. It is even more preferable if the resistor 30 is 1 μm thick or less, because the cracks in the film constituting the resistor 30 due to the film's internal stress, and the warping of the film from the substrate 10 can be reduced. The width of the resistor 30 may preferably be optimized in accordance with the required specifications such as the resistance value and the lateral sensitivity, and be set to, for example, approximately 10 μm or more and 100 μm or less, as a countermeasure against disconnections.

For example, if the resistor 30 is a Cr composite film, the stability of gauge characteristics can be improved by using α-Cr (alpha-chromium), which has a stable crystalline phase, as the main component. Additionally, when the resistor 30 contains α-Cr as its main component, the strain gauge 1 can have a gauge factor of 10 or higher, as well as a gauge factor temperature coefficient TCS and a resistance temperature coefficient TCR in the range of −1,000 ppm/degrees Celsius to +1,000 ppm/degrees Celsius. Here, "the main component" means that the substance of interest takes up 50% or more, by weight, of all substances constituting the resistor. It is preferable if the resistor 30 contains 80% or more of α-Cr by weight, and more preferable if the resistor 30 contains 90% or more of α-Cr by weight, from the perspective of improving the gauge characteristics. Note that α-Cr is a Cr having a body-centered cubic structure (bcc structure).

Also, when the resistor 30 is a Cr composite film, the CrN and $Cr_2N$ contained in the Cr composite film are preferably 20% or less by weight. When the CrN and $Cr_2N$ contained in the Cr composite film are 20% or less by weight, the decrease in the gauge ratio can be reduced.

Furthermore, the proportion of $Cr_2N$ in CrN and $Cr_2N$ is preferably 80% or more by weight and less than 90% by weight, and, more preferably, 90% or more by weight and less than 95% by weight. When the proportion of $Cr_2N$ in CrN and $Cr_2N$ is 90% or more by weight and less than 95% by weight, $Cr_2N$, which has semiconductor-like properties, makes the decrease of TCR (negative TCR) more noticeable. Furthermore, reduced use of ceramic materials enables the reduction of brittle fracture as well.

Meanwhile, when a small amount of $N_2$ or atomic N gets mixed or is present in the film, the external environment (for example, high temperature environment) might make them escape from the film, which might result in a change in the film stress. By creating a chemically stable CrN, a stable strain gauge can be obtained without generating the above unstable N.

The conductive traces 41 and 42 are formed on the substrate 10. The electrodes 51 and 52 are formed on the substrate 10, and electrically connected to the resistor 30 via the conductive traces 41 and 42. For example, the electrodes 51 and 52 are wider than the conductive traces 41 and 42 and formed in a substantially rectangular shape. The electrodes 51 and 52 are a pair of electrodes for outputting the strain-induced changes in the resistance value of the resistor 30 to the outside, and are connected to lead wires for external connection, for example. In FIG. 1, for ease of explanation, the conductive traces 41 ad 42 and the electrodes 51 and 52 are shown with a satin pattern that is sparser than that of the resistor 30.

Note that the resistor 30, the conductive traces 41 and 42, and the electrodes 51 and 52 are assigned different reference signs for ease of explanation, but they can be formed integrally from the same material in the same process. Therefore, the resistor 30, the conductive traces 41 and 42, and the electrodes 51 and 52 have substantially the same thickness.

The upper surfaces of the conductive traces 41 and 42 and the electrodes 51 and 52 may be covered by a metal that is made of a material having a lower resistance than the conductive traces 41 and 42 and the electrodes 51 and 52. For example, when the resistor 30, the conductive traces 41 and 42, and the electrodes 51 and 52 are a Cr composite film, the metallic material having a lower resistance than the Cr composite film may be Cu, Ni, Al, Ag, Au, or Pt, an alloy of any of these metals, a compound of any of these metals, or a laminated film obtained by appropriately laminating any of these metals, alloys, or compounds.

A cover layer 60 (insulating resin layer) may be provided over the upper surface 10a of the substrate 10 so as to cover the resistor 30 and the conductive traces 41 and 42 and expose the electrodes 51 and 52. By providing the cover layer 60, the resistor 30 and the conductive traces 41 and 42 can be prevented from, for example, getting mechanically damaged. Furthermore, by providing the cover layer 60, the resistor 30 and the conductive traces 41 and 42 can be protected from moisture and the like. Note that the cover layer 60 may be provided so as to cover all parts except for the electrodes 51 and 52.

The cover layer 60 can be formed from an insulating resin such as a PI resin, an epoxy resin, a PEEK resin, a PEN resin, a PET resin, a PPS resin, or a composite resin (for example, a silicone resin or a polyolefin resin). The cover layer 60 may contain fillers or pigments. The thickness of the cover layer 60 is not particularly limited and can be selected in accordance with the purpose of use, and may be, for example, approximately 2 μm to 30 μm.

Now, the strain resistance of the strain gauge 1 will be explained. The present inventors have found through studies that the narrower the width of the conductive traces 41 and 42, the less likely cracks and disconnections will occur when the conductive traces 41 and 42 are strained. To be more specific, the present inventors have investigated the occurrence of cracks and disconnections by preparing four types of test strain gauges, in which the width of the conductive traces 41 and 42 are 10 μm, 100 μm, 345 μm, and 560 μm, preparing a number of each type, and applying strain to each. Note that, in this experiment, the conductive traces 41 and 42 were a Cr composite film that was 0.2 μm thick.

The outcome of the experiment showed that, as the width of the conductive traces 41 and 42 narrowed, cracks and disconnections tended to occur less, and this made it clear that the strain limit depended on the width of the conductive traces 41 and 42. Note that the strain limit is the value of mechanical strain at which cracks or disconnections begin to occur when strain is applied to the strain gauge.

FIG. 3 is a diagram that shows the outcome of the strain limit experiment, in which the minimum strain limit values of a plurality of test strain gauges are plotted. As shown in FIG. 3, according to the outcome of the present inventors' experiment, the strain limit when the width of the conductive traces 41 and 42 was 560 μm was 5500 με or more, whereas the strain limit when the width of the conductive traces 41 and 42 was 10 μm was 8500 με or more. That is, when the width of the conductive traces 41 and 42 is 10 μm, the strain limit is about 1.5 times as large as that when the width of the conductive traces 41 and 42 is 560 μm. Moreover, the strain limit improves substantially linearly when the width of the conductive traces 41 and 42 is from 560 μm to 10 μm. Furthermore, from the outcome shown in FIG. 3, it is assumed that, even when the width of the conductive traces 41 and 42 is less than 10 μm, the strain limit further improves substantially linearly.

The reason this result was obtained might be because brittle fracture is likely to occur when the width of the conductive traces 41 and 42, made of a Cr composite film having a high elastic modulus, is large, and because the apparent resistance to fracture increased by narrowing the width of the conductive traces 41 and 42. When the strain gauge 1 is actually used, a strain limit of approximately 8,000 με is required, so that the width of the conductive traces 41 and 42 is preferably 100 μm or less. On the other hand, it is difficult to make the width of the conductive traces 41 and 42 less than 5 μm in terms of the manufacturing process. Considering this point, the width of the conductive traces 41 and 42 is preferably 5 μm or more and 100 μm or less. Furthermore, from FIG. 3, the width of the conductive traces 41 and 42 is preferably 5 μm or more and 10 μm or less when a strain limit of 8500 με or more is required.

In addition, when stress concentrates on the conductive traces 41 and 42, the conductive traces 41 and 42 may be disconnected. When the resistor 30 and the conductive traces 41 and 42 are made of the same material (for example, a Cr composite film), the concentration of stress on the conductive traces 41 and 42 can be reduced by making the width of the conductive traces 41 and 42 narrower than or equal to the width of the resistor 30. As a result of this, the conductive traces 41 and 42 are prevented from disconnecting even when a large strain is applied to the strain gauge 1.

The strain gauge 1 is applied to the flexure element, and, by expanding and contracting following the movement of the flexure element, detects the amount of strain of the flexure element. Therefore, to detect a larger amount of strain, the strain gauge 1 itself must not be damaged (disconnected, for example) during the process of expansion and contraction, and so higher strain resistance is required. With the strain gauge 1, by making the width of the conductive traces 41 and 42 5 μm or more and 100 μm or less, it is possible to improve the strain limit (improve the strain resistance).

In the entirety of the conductive trace 41 and in the entirety of the conductive trace 42, the width is preferably 5 μm or more and 100 μm or less. However, for example, even if the conductive trace 41 and the conductive trace 42 have portions that are wider than 100 μm, such as the thick portions 451 and 461 shown in FIG. 6, as long as the conductive traces 41 and 42 have portions that are 5-μm thick ore more and 100 μm thick or less, it still brings about a certain effect of improving the strain limit (improving the strain resistance).

To manufacture the strain gauge 1, first, the substrate 10 is prepared, and a metal layer (referred to as "metal layer A" for ease of explanation) is formed over the upper surface 10a of the substrate 10. The metal layer A is a layer that in the end is patterned to become the resistor 30, the conductive traces 41 and 42, and the electrodes 51 and 52. Therefore, the material and thickness of the metal layer A are the same as those of the resistor 30, the conductive traces 41 and 42, and the electrodes 51 and 52 described above.

The metal layer A can be formed, for example, by magnetron sputtering which uses, as a target, a raw material that can form the metal layer A. The metal layer A may be formed by using reactive sputtering, vapor deposition, arc ion plating, pulse laser deposition, and so forth, instead of magnetron sputtering.

From the perspective of achieving stable gauge characteristics, before forming the metal layer A, it is preferable to vacuum-form a functional layer of a predetermined thickness as an underlying layer, over the upper surface 10a of the substrate 10 by, for example, conventional sputtering.

In the present disclosure, a functional layer refers to a layer having a function of promoting the crystal growth of at least the upper metal layer A (resistor 30). The functional layer preferably further has a function of preventing oxidation of the metal layer A due to the oxygen and moisture contained in the substrate 10, a function of improving the adhesion between the substrate 10 and the metal layer A, and so forth. The functional layer may also have other functions as well.

The insulating resin film that constitutes the substrate 10 contains oxygen and moisture. In particular, when the metal layer A contains Cr, Cr forms a self-autoxidized film, and it is therefore effective if the functional layer has a function of preventing oxidation of the metal layer A.

The material of the functional layer is not particularly limited as long as it at least has a function of facilitating the crystal growth of the metal layer A (resistor 30), which is an upper layer, and can be selected in accordance with the purpose of use. The material may be, for example, one or more types of metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), an alloy of some of the metals in this group, or a compound of some of the metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed from a conductive material such as a metal or an alloy, the film thickness of the functional layer is preferably $\frac{1}{20}$ or less of the film thickness of the resistor. When the film thickness of the functional layer is in this range, it is possible to facilitate the crystal growth of α-Cr, and prevent a situation where part of the current flowing in the resistor flows into the functional layer and lowers the sensitivity of strain detection.

When the functional layer is formed from a conductive material such as a metal or an alloy, the film thickness of the functional layer is more preferably $\frac{1}{50}$ or less of the film thickness of the resistor. When the film thickness of the functional layer is in this range, it is possible to facilitate the crystal growth of α-Cr, and prevent, more effectively, a situation where part of the current flowing in the resistor flows into the functional layer and lowers the sensitivity of strain detection.

When the functional layer is formed from a conductive material such as a metal or an alloy, the film thickness of the functional layer is even more preferably $\frac{1}{100}$ or less of the film thickness of the resistor. When the film thickness of the functional layer is in this range, it is possible to prevent, even more effectively, a situation where part of the current flowing in the resistor flows into the functional layer and lowers the sensitivity of strain detection.

When the functional layer is formed from an insulating material such as an oxide or a nitride, the film thickness of the functional layer is preferably 1 cm to 1 μm. When the film thickness of the functional layer is in this range, it is possible to facilitate the crystal growth of α-Cr, and form a film with ease without forming cracks in the functional layer.

When the functional layer is formed from an insulating material such as an oxide or a nitride, the film thickness of the functional layer is more preferably 1 cm to 0.8 μm. When the film thickness of the functional layer is in this range, it is possible to facilitate the crystal growth of α-Cr, and form a film even more easily without forming cracks in the functional layer.

When the functional layer is formed from an insulating material such as an oxide or a nitride, the film thickness of the functional layer is even more preferably 1 nm to 0.5 μm. When the film thickness of the functional layer is in this range, it is possible to facilitate the crystal arowth of α-Cr, and form a film even more easily without forming cracks in the functional layer.

Note that the plan shape of the functional layer is patterned substantially the same as the plan shape of the resistor illustrated in FIG. 1, for example. However, the plan shape of the functional layer does not necessarily have to be substantially the same as the plan shape of the resistor. When the functional layer is formed from an insulating material, it does not have to be patterned in the same shape as the plan shape of the resistor. In this case, the functional layer may be formed solidly at least in the region where the resistor is formed. Alternatively, the functional layer may be formed solidly over the entire upper surface of the substrate 10.

Also, when the functional layer is formed from an insulating material, the functional layer may be made relatively thick, such as 50 nm thick or more and 1 μm thick or less, and may be formed in a solid shape, so that the thickness and the surface area of the functional layer increase, and the heat that is generated when the resistor warms up can be readily dissipated to the substrate 10 side. As a result of this, with the strain gauge 1, it is possible to reduce the decrease of the accuracy of measurement due to the resistor's self-heating.

The functional layer can be vacuum-formed by, for example, conventional sputtering, in which a raw material that can form the functional layer is used as a target and an Ar (argon) gas is introduced into a chamber. By using conventional sputtering, the functional layer is formed while the upper surface 10a of the substrate 10 is being etched with Ar, and therefore it is possible to form the functional layer only in a minimal amount, and achieve an effect of improved adhesion.

However, this is simply one example of the method of forming the functional layer, and the functional layer may be formed by using other methods as well. For example, a method may be used here in which: before the functional layer is formed, the upper surface 10a of the substrate 10 is activated by plasma treatment using Ar or the like, so as to gain an adhesion improving effect; and subsequently, the functional layer is vacuum-formed by magnetron sputtering.

The combination of the material of the functional layer and the material of the metal layer A is not particularly limited and can be selected in accordance with the purpose of use. For example, it is possible to form a Cr composite film by using Ti as the main component of the functional layer and α-Cr (alpha-chromium) as the main component of the first metal layer.

In this case, the first metal layer can be formed by magnetron sputtering, in which a raw material that can form a Cr composite film is used as a target, and an Ar gas is introduced into a chamber. Alternatively, reactive sputtering, which targets pure Cr and introduces an appropriate amount of nitrogen gas into a chamber with an Ar gas, may be used to form the metal layer A. In this case, by changing the amount and pressure (nitrogen partial pressure) of nitrogen gas to be introduced, adjusting the heating temperature by providing a heating step, and so forth, it is possible to adjust the proportions of CrN and $Cr_2N$ contained in the Cr composite film, as well as the proportion of $Cr_2N$ in CrN and $Cr_2N$.

According to these methods, the growth surface of the Cr composite film is defined based on the functional layer consisting of Ti, and a Cr composite film, in which α-Cr having a stable crystalline structure is the main component, can be formed. Also, Ti that constitutes the functional layer is diffused in the Cr composite film, so that improved gauge characteristics can be gained. For example, the gauge factor of the strain gauge 1 can be made 10 or more, and the gauge factor temperature coefficient TCS and the resistance temperature coefficient TCR can be kept in the range of −1,000 ppm/degrees Celsius to +1,000 ppm/degrees Celsius. Note that, when the functional layer is formed from Ti, the Cr composite film might contain Ti or TiN (titanium nitride).

Note that, when the metal layer A is a Cr composite film, the functional layer consisting of Ti has all of: the function of facilitating the crystal growth of the metal layer A; the function of preventing oxidation of the metal layer A due to the oxygen or moisture contained in the substrate 10; and the function of improving the adhesion between the substrate 10 and the metal layer A. The same applies when Ta, Si, Al, or Fe is used for the functional layer, instead of Ti.

In this way, by providing a functional layer in a lower layer of the metal layer A, it becomes possible to facilitate the crystal arowth of the metal layer A, and fabricate a first metal layer consisting of a stable crystalline phase. As a result of this, the stability of gauge characteristics in the strain gauge 1 can be improved. Furthermore, since the material to constitute the functional layer is diffused in the metal layer A, the strain gauge 1 can have improved gauge characteristics.

Next, the metal layer A is patterned by photolithography, and the flat resistor 30, conductive traces 41 and 42, and electrodes 51 and 52 shown in FIG. 1 are formed.

Subsequently, if necessary, a cover layer is provided over the upper surface 10a of the substrate 10 to cover the resistor 30 and the conductive traces 41 and 42, and expose electrodes 51 and 52, thereby completing the strain gauge 1. The cover layer can be produced, for example, by laminating a semi-cured thermosetting insulating resin film over the upper surface 10a of the substrate 10, so as to cover the resistor 30 and the conductive traces 41 and 42, and expose the electrodes 51 and 52, followed by curing by heating. The cover layer may be produced by coating the upper surface 10a of the substrate 10 with a liquid or paste thermosetting insulating resin so as to cover the resistor 30 and the conductive traces 41 and 42, and expose the electrodes 51 and 52, followed by curing by heating.

Figure 4:
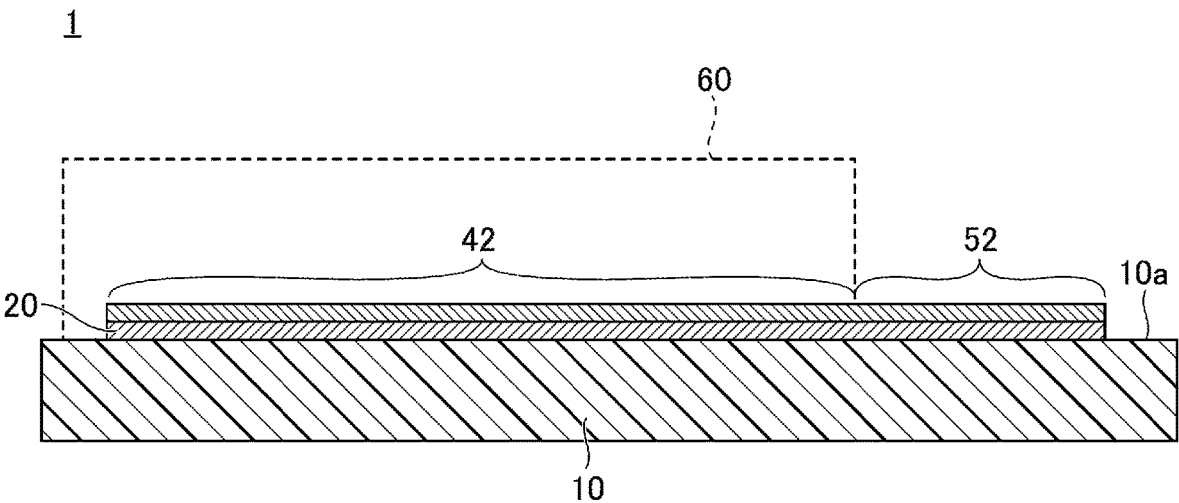
FIG. 4 is a cross-sectional view (example 2) that illustrates an example of the strain gauge according to the first embodiment.

Note that, when a functional layer is provided on the upper surface 10a of the substrate 10 as a base layer for the resistor 30, the conductive traces 41 and 42, and the electrodes 51 and 52, the strain gauge 1 has the cross-sectional shape shown in FIG. 4. The layer denoted by the reference sign 20 is the functional layer. The planar shape of the strain gauge 1 when the functional layer 20 is provided is, for example, the same as that shown in FIG. 1. However, as described above, the functional layer 20 may be formed solidly in part or all of the upper surface of the substrate 10. Note that the functional layer 20 is very thin in comparison to the resistor 30 and the conductive traces 41 and 42, so that the presence or absence of the functional layer is likely to have no effect on the strain limits of the resistor 30 and the conductive traces 41 and 42.

Modifications of the First Embodiment

In accordance with a modification of the first embodiment, an example in which the conductive traces are patterned differently will be described below. Note that, in the modifications of the first embodiment, the description of components that are the same as those of the above-described embodiment might be omitted.

Figure 5:
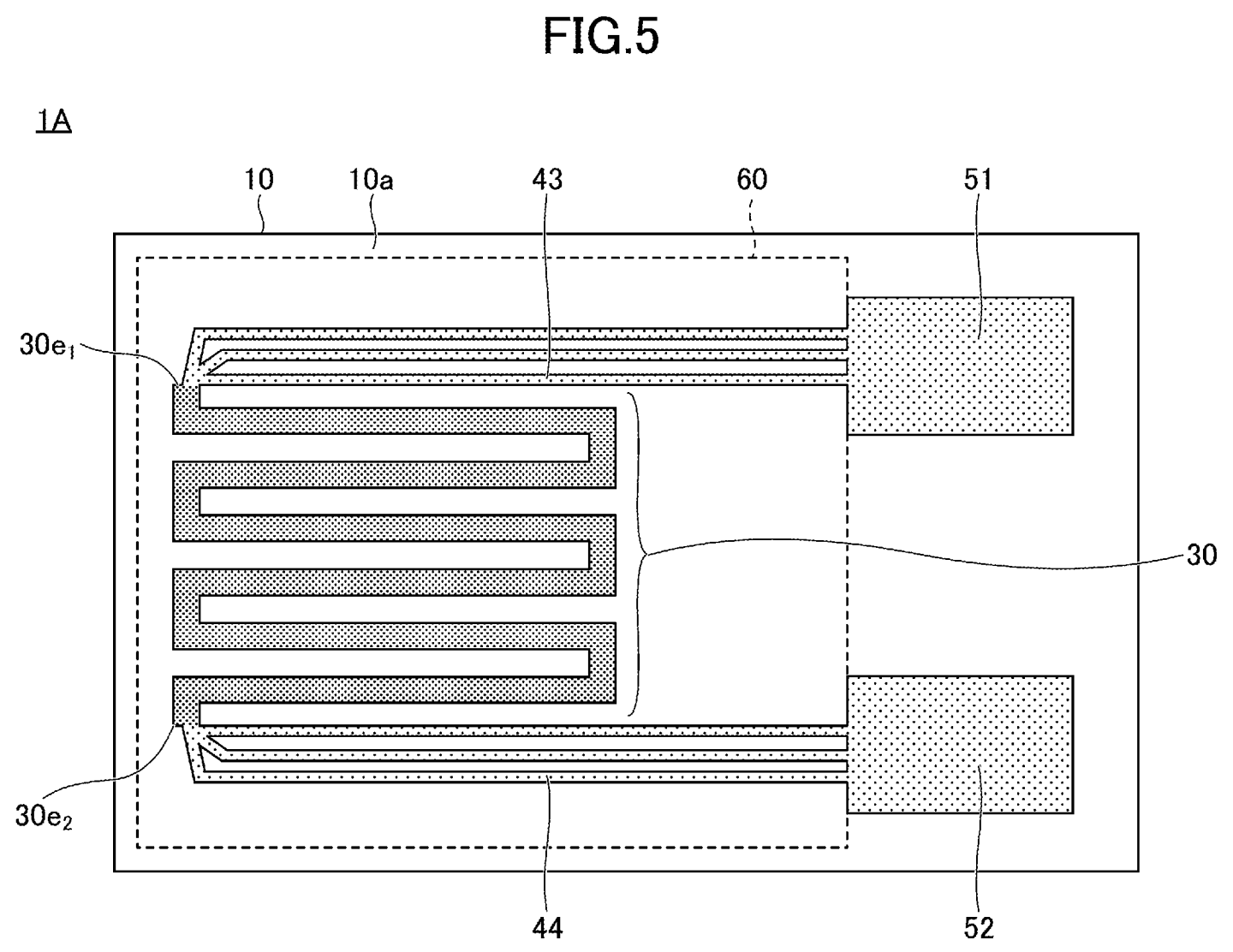

FIG. 5 is a plan view that illustrates a strain gauge according to a modification 1 of the first embodiment. Referring to FIG. 5, a strain gauge 1A differs from the strain gauge 1 (see FIGS. 1, 2, etc.) in that the conductive traces 41 and 42 are replaced with conductive traces 43 and 44. Note that the conductive trace 43 is an example of a third conductive trace according to the present disclosure, and the conductive trace 44 is an example of a fourth conductive trace according to the present disclosure.

In the strain gauge 1A, the end $30e_1$ of the resistor 30 in the grid width direction and the electrode 51 are electrically connected by three conductive traces 43 that are connected in parallel. Also, the end $30e_2$ of the resistor 30 in the grid width direction and the electrode 52 are electrically connected by three conductive traces 44 that are connected in parallel. The entirety of each conductive trace 43 and the entirety of each conductive trace 44 have a width of 5 μm or more and 100 μm or less.

In this way, the conductive traces to connect between the resistor 30 and the electrodes 51 and 52 may be made multi-tracked. In this case, again, by making the width of each conductive trace 43 and each conductive trace 44 5 μm or more and 100 μm or less, it is possible to improve the strain limit (improve the strain resistance) as in the case of the conductive traces 41 and 42.

Furthermore, even if some of the conductive traces 43 and 44 are damaged (disconnected, etc.), the strain gauge 1A can still operate as long as at least one conductive trace 43 and one conductive trace 44 are connected. Note that the number of multiple conductive traces has only to be two or more, and is not limited to three as illustrated in FIG. 5.

Figure 6:
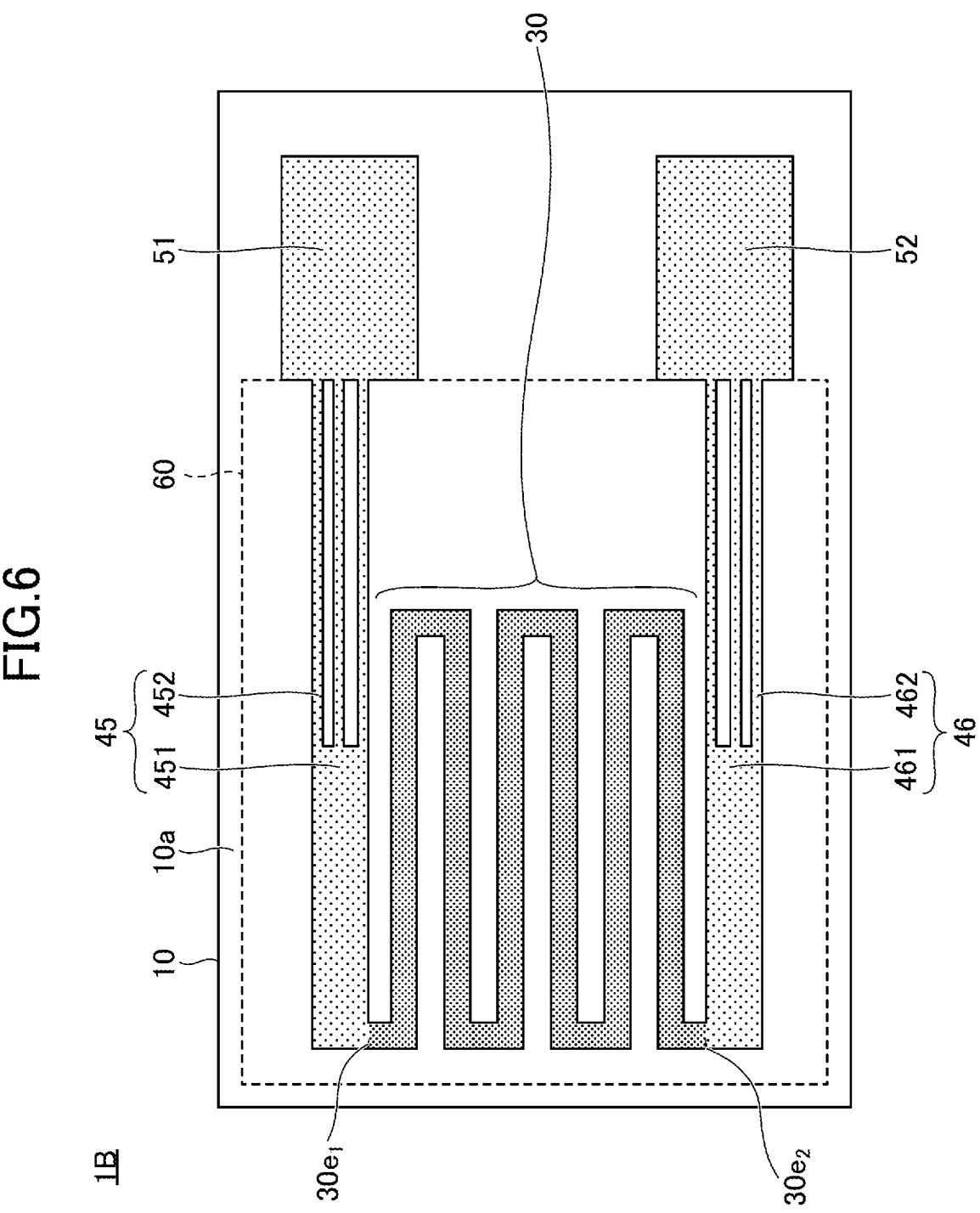
FIG. 6 is a cross-sectional view that illustrates an example of a strain gauge according to a modification 2 of the first embodiment.

FIG. 6 is a plan view that illustrates a strain gauge according to a modification 2 of the first embodiment. Referring to FIG. 6, a strain gauge 1B differs from the strain gauge 1 (see FIGS. 1, 2, etc.) in that the conductive traces 41 and 42 are replaced with conductive traces 45 and 46. Note that the conductive trace 45 is an example of a fifth conductive trace according to the present disclosure, and the conductive trace 46 is an example of a sixth conductive trace according to the present disclosure.

In the strain gauge 1B, an end $30e_1$ of the resistor 30 in the grid width direction and the electrode 51 are electrically connected by the conductive trace 45. An end $30e_2$ of the resistor 30 in the grid width direction and the electrode 52 are electrically connected by the conductive trace 46.

The conductive trace 45 includes: one thick portion 451 that has its one end electrically connected to the end $30e_1$ of the resistor 30 in the grid width direction; and three thin portions 452 that branch from the other end of the thick portion 451 and that are electrically connected to the electrode 51. Also, the conductive trace 46 includes: one thick portion 461 that has its one end electrically connected to the end $30e_2$ of the resistor in the grid width direction, and three thin portions 462 that branch from the other end of the thick portion 461 and that are electrically connected to the electrode 52.

The entirety of each thin portion 452 and the entirety of each thin portion 462 have a width of 5 μm or more and 100 μm or less. The thick portion 451 is wider than each thin portion 452, and, in the entirety of the thick portion 451, the width may be greater than 100 μm. Also, the thick portion 461 may be wider than each thin portion 462, and, in the entirety of the thick portion 461, the width may be greater than 100 μm.

In this way, when making a conductive trace multi-tracked, it is not necessary to make the entire part between the resistor 30 and the electrode 51 or 52 multi-tracked, and merely part of the conductive trace may be made multi-tracked. In this case, again, by making the width of each thin portion 452 and each thin portion 462 5 μm or more and 100 μm or less, it becomes possible to improve the strain limit (improve the strain resistance) as in the case of the conductive traces 41 and 42.

Also, even if part of the thin portions 452 or 462 is damaged (disconnected, etc.), the strain gauge 1B can still operate as long as at least one of the thin portions 452 or 462 is connected. Note that the number of parts making up the multi-tracked part (the number of thin portions) has only to be two or more, and is not limited to three as shown in FIG. 6.

Although a preferred embodiment and other forms of the present disclosure have been described above in detail as examples, the present disclosure is by no means limited to these examples, and a variety of modifications and replacements can be introduced to the above examples without departing from the scope set forth in the claims.

Also, the present disclosure is applicable to strain gauges with multiple resistors formed on a substrate. The present disclosure can also be applied to, for example, a strain gauge that forms a half-bridge circuit with two resistors formed on a substrate. Alternatively, the present disclosure is also applicable to, for example, a strain gauge that forms a full-bridge circuit with four resistors formed on a substrate.

This international application claims priority to Japanese Patent Application No. 2020-205935, filed Dec. 11, 2020, and Japanese Patent Application No. 2021-094559, filed Jun. 4, 2021, the entire contents of which are incorporated herein by reference.

REFERENCE SIGNS LIST

1, 1A, 1B strain gauge
10 substrate
10*a* upper surface
20 functional layer
30 resistor
30*e*₁, 30*e*₂ end
41, 42, 43, 44, 45, 46 conductive trace
51, 52 electrode
60 cover layer
451, 461 thick portion
452, 462 thin portion

The invention claimed is:

1. A strain gauge comprising:
a flexible substrate;
a resistor formed on the substrate; and
a pair of electrodes formed on the substrate and electrically connected with the resistor via conductive traces,
wherein a width of the resistor is 10 μm or more and 100 μm or less,
wherein a width of each of the conductive traces is 5 μm or more and 100 μm or less, and
each of the conductive traces includes a portion having a width smaller than the width of the resistor.

2. The strain gauge according to claim 1, wherein a strain limit is 8,000 us or more.

3. The strain gauge according to claim 1, wherein the conductive traces electrically connect each end of the resistor in a grid width direction with a corresponding one of the pair of electrodes.

4. The strain gauge according to claim 3,
wherein the conductive traces include:
a first conductive trace that electrically connects one end of the resistor in the grid width direction with one of the pair of electrodes; and
a second conductive trace that electrically connects the other end of the resistor in the grid width direction and the other one of the pair of electrodes, and wherein an entirety of the first conductive trace and an entirety of the second conductive trace have the width of 5 μm or more and 100 μm or less.

5. A strain gauge comprising:
a flexible substrate;
a resistor formed on the substrate; and
a pair of electrodes formed on the substrate and electrically connected with the resistor via conductive traces,
wherein the conductive traces further include:
two or more first conductive traces that electrically connect one end of the resistor in a grid width direction with one of the pair of electrodes; and
two or more second conductive traces that electrically connect another end of the resistor in the grid width direction with another one of the pair of electrodes, and
wherein an entirety of each first conductive trace and an entirety of each second conductive trace have a width of 5 μm or more and 100 μm or less.

6. A strain gauge comprising:
a flexible substrate;
a resistor formed on the substrate; and
a pair of electrodes formed on the substrate and electrically connected with the resistor via conductive traces,
wherein the conductive traces further include:
a first conductive trace that electrically connects one end of the resistor in a grid width direction with one of the pair of electrodes; and
a second conductive trace that electrically connects another end of the resistor in the grid width direction with another one of the pair of electrodes,
wherein the first conductive trace includes:
one thick portion, one end of which is electrically connected to the one end of the resistor in the grid width direction; and
two or more thin portions that branch from another end of the thick portion and that are electrically connected to the one of the pair of electrodes,
wherein the second conductive trace includes:
one thick portion, one end of which is electrically connected to the another end of the resistor in the grid width direction; and
two or more thin portions that branch from another end of the thick portion and that are electrically connected to the another one of the pair of electrodes, and
wherein an entirety of each thin portion has a width of 5 μm or more and 100 μm or less.

7. The strain gauge according to claim 6, wherein an entirety of the thick portion has a width greater than 100 μm.

8. The strain gauge according to claim 1, wherein the conductive traces are formed integrally with the resistor by using a same material.

9. The strain gauge according to claim 1, wherein the resistor is formed with a film containing Cr, CrN, and Cr₂N.

10. The strain gauge according to claim 9, wherein a gauge factor is 10 or more.

11. The strain gauge according to claim 9, wherein the CrN and the Cr₂N contained in the resistor are 20% or less by weight.

12. The strain gauge according to claim 11, wherein a proportion of the Cr₂N in the CrN and the Cr₂N is 80% or more by weight and less than 90% by weight.

* * * * *